United States Patent
Dauer et al.

(10) Patent No.: US 8,198,356 B2
(45) Date of Patent: *Jun. 12, 2012

(54) COMPOSITE PARTS FOR AIRPLANE ENGINES

(75) Inventors: John C. Dauer, Mason, OH (US); Timothy D. Krizan, Wilmington, DE (US); Martin W. Prellwitz, North Royalton, OH (US)

(73) Assignee: E I du Pont de Nemours and Company, Wilmington, DE (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/549,462

(22) Filed: Aug. 28, 2009

(65) Prior Publication Data

US 2010/0055455 A1    Mar. 4, 2010

Related U.S. Application Data

(60) Provisional application No. 61/092,904, filed on Aug. 29, 2008.

(51) Int. Cl.
*C08K 3/24* (2006.01)
*C08K 3/04* (2006.01)
*C09C 1/44* (2006.01)
*C09C 1/46* (2006.01)
*C09C 1/40* (2006.01)
*C09C 1/42* (2006.01)

(52) U.S. Cl. ........ 524/495; 524/442; 524/445; 524/447; 524/449; 524/451; 524/492; 524/496; 524/847; 428/363; 428/402; 428/473.5; 428/474.4

(58) Field of Classification Search .................. 428/338, 428/402, 473.5; 524/495, 496, 600, 601, 524/606, 847
See application file for complete search history.

(56) References Cited

U.S. PATENT DOCUMENTS

| | | | | |
|---|---|---|---|---|
| 4,360,626 A | * | 11/1982 | Manwiller | 524/495 |
| 4,755,555 A | * | 7/1988 | Manwiller et al. | 524/607 |
| 5,013,817 A | | 5/1991 | Ohta et al. | |
| 5,043,419 A | | 8/1991 | Ohta et al. | |
| 5,817,418 A | | 10/1998 | Goto et al. | |
| 5,886,129 A | * | 3/1999 | DeColibus | 528/170 |
| 7,758,781 B2 | * | 7/2010 | Schmeckpeper et al. | 264/77 |
| 7,802,963 B2 | | 9/2010 | Holland et al. | |
| 2002/0071760 A1 | * | 6/2002 | Dingwell et al. | 415/160 |
| 2005/0215715 A1 | * | 9/2005 | Schmeckpeper et al. | 525/191 |
| 2006/0245715 A1 | | 11/2006 | Matsumoto et al. | |
| 2007/0021547 A1 | * | 1/2007 | Suzuki et al. | 524/496 |
| 2008/0039574 A1 | | 2/2008 | Nagao et al. | |
| 2010/0029825 A1 | * | 2/2010 | Burch et al. | 524/447 |
| 2010/0056695 A1 | | 3/2010 | Alms et al. | |

FOREIGN PATENT DOCUMENTS

| | | |
|---|---|---|
| EP | 654586 B1 | 7/1997 |
| GB | 2127423 | 4/1984 |
| WO | 95/20005 | 7/1995 |
| WO | 2006078064 A1 | 7/2006 |
| WO | 2006/128127 | 11/2006 |

OTHER PUBLICATIONS

Office Action dated Jun. 30, 2011 for U.S. Appl. No. 12/549,482.

* cited by examiner

*Primary Examiner* — Ling Choi
*Assistant Examiner* — Darcy D Laclair

(57) ABSTRACT

Disclosed herein is a composite part for an airplane engine comprising polymer selected from polyimide, polyamide-imide, polyether imides, polybenzimidazole, or blends thereof, and carbonaceous filler, which in combination provides thermal stability and wear resistance. Optionally, the composite may comprise particulate.

9 Claims, 1 Drawing Sheet

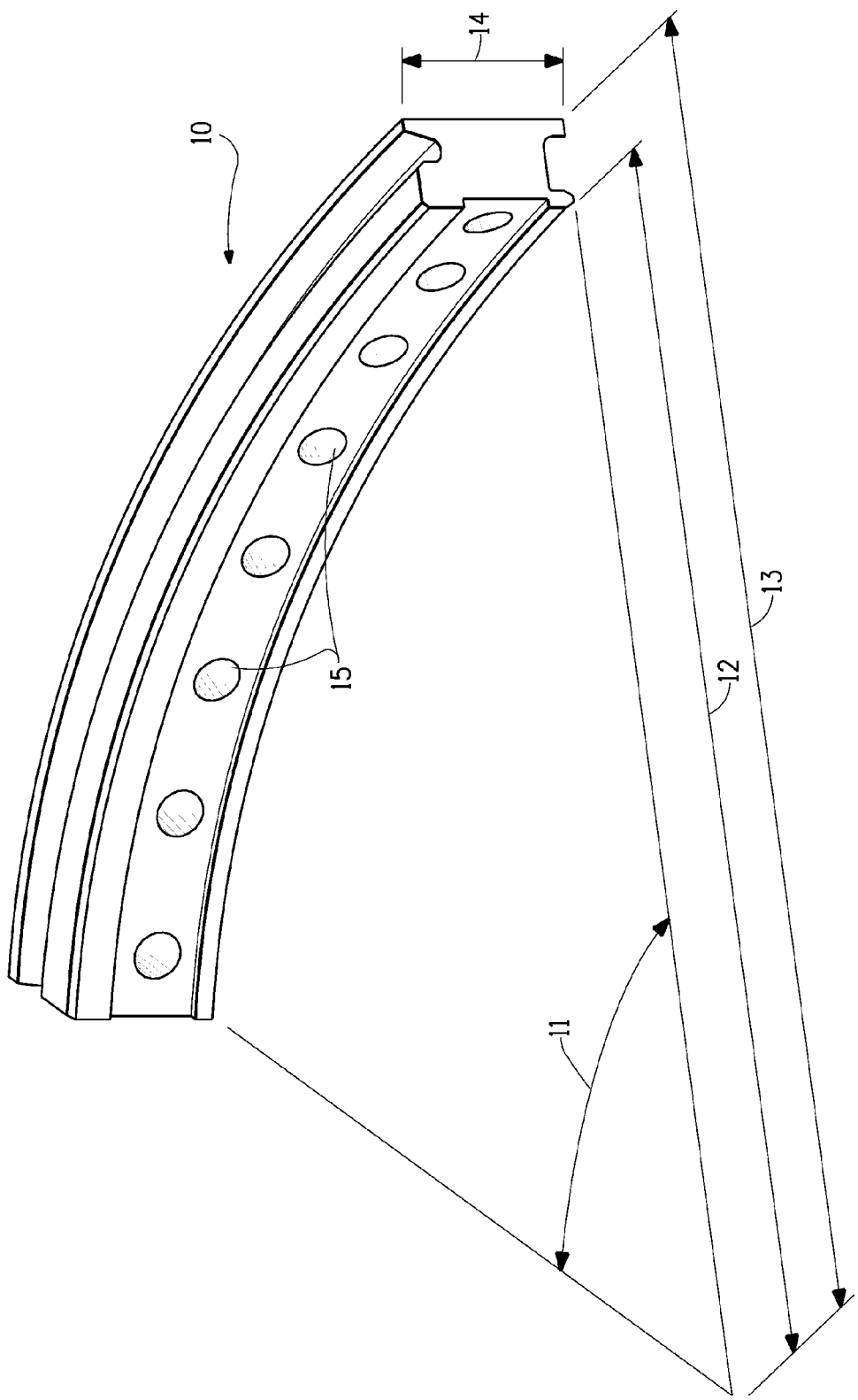

COMPOSITE PARTS FOR AIRPLANE ENGINES

CROSS-REFERENCE TO RELATED APPLICATIONS

This application claims the benefit of U.S. Provisional Application No. 61/092,904, filed Aug. 29, 2008, which is incorporated herein by reference in its entirety.

FIELD OF THE INVENTION

The present invention is directed to composite airplane engine parts, and particularly to parts that are rings or segments of rings such as shrouds or segments of shrouds.

BACKGROUND OF THE INVENTION

Airplane engines require parts that are wear resistant, thermally stable and light in weight. Many airplane engines make use of an axial compressor to compress the incoming air before the air is passed to the combustor section of the engine. The axial compressor uses alternating rows of rapidly rotating blades, i.e., rotors, and rows of stator vanes that are fixed and do not rotate. The combined action of the rotor blades and the stator vanes increases the air pressure. The stator vanes can be variable, i.e., they may turn or pivot on their longitudinal axis, to allow better control of airflow and pressure. A row of rotors and a row of stators is referred to as a stage. An axial compressor typically has several stages. The stator vanes are held radially between the outer engine casing and an inner shroud. An inner shroud is fixed in place about the rotating shaft of the engine. The vane end, referred to as a spindle or trunnion, fits in a recess machined into the inner shroud. When the shroud and the vanes are both composed of metal, wear can occur between the vane spindle and the inner shroud. Polymer bushings of a high temperature resistant, wear resistant polymer such as Vespel® brand polyimide (available from DuPont Co., Wilmington, Del.) can be used to reduce metal-to-metal wear.

There is a need for airplane engine parts that are lighter than metal, thermally stable and wear resistant.

SUMMARY OF THE INVENTION

This invention provides a composite ring or segment of a ring for an aircraft engine, the composite comprising from about 40 to about 90 weight percent of a polymer component selected from the group consisting of polyimide, polyamide-imide, polyether imide, polybenzimidazole, and blends thereof;

at least about 9 weight percent of a carbonaceous filler component;

optionally, particulate component up to about 51 weight percent; wherein the total of all components is 100 weight percent; and wherein the composite has a thermal oxidative weight loss (TOWL) of less than 5% when determined after heating at 700° F. (371° C.) for 100 hours at 70 psi (0.48 MPa) in air, the air being exchanged at a rate of 5 times/hour, and has a dynamic coefficient of friction of less than 0.5 and wherein said composite ring or segment of a ring is a suitable replacement for a metal ring or segment of a metal ring.

In one embodiment, the composite ring or segment of a ring is an inner shroud or a segment of an inner shroud that is used with variable vanes.

BRIEF DESCRIPTION OF THE DRAWING

FIG. 1 shows a representation of a segment of an inner shroud.

DETAILED DESCRIPTION OF THE INVENTION

The composite ring or segment of a ring is prepared from a composite comprising a polymer and carbonaceous filler, such as graphite powder (or flake). The complete ring part can consist of a single piece or of more than one piece, i.e., two or more segments. One use for such a ring in an airplane engine is as a shroud, particularly as an inner shroud.

The composite comprises from at least about 40 to about 90 weight percent of a polymer component, at least about 9 weight percent of a carbonaceous filler component; and optionally, particulate up to about 51 weight percent; wherein the total of all components of the composite is 100 weight percent. The polymer is selected from the group consisting of polyimide, polyamide-imide, polyether imide, polybenzimidazole, and blends thereof. Preferably, the polymer is polyimide and the carbonaceous filler is comprised is graphite powder or graphite flake.

The polyimide contains the characteristic —CO—NR—CO— group as a linear or heterocyclic unit along the main chain of the polymer backbone. The polyimide can be obtained, for example, from the reaction of monomers such as an organic tetracarboxylic acid, or the corresponding anhydride or ester derivative thereof, with an aromatic diamine.

A polyimide precursor as used to prepare a polyimide is an organic polymer that becomes the corresponding polyimide when the polyimide precursor is heated or chemically treated. In certain embodiments of the thus-obtained polyimide, about 60 to 100 mole percent, preferably about 70 mole percent or more, more preferably about 80 mole percent or more, of the repeating units of the polymer chain thereof has a polyimide structure as represented, for example, by the following formula:

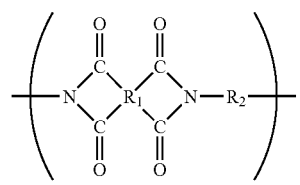

wherein $R_1$ is a tetravalent aromatic radical having 1 to 5 benzenoid-unsaturated rings of 6 carbon atoms, the four carbonyl groups being directly bonded to different carbon atoms in a benzene ring of the $R_1$ radical and each pair of carbonyl groups being bonded to adjacent carbon atoms in the benzene ring of the $R_1$ radical; and $R_2$ is a divalent aromatic radical having 1 to 5 benzenoid-unsaturated rings of carbon atoms, the two amino groups being directly bonded to different carbon atoms in the benzene ring of the $R_2$ radical.

Preferred polyimide precursors are aromatic, and provide, when imidized, polyimides in which a benzene ring of an aromatic compound is directly bonded to the imide group. An especially preferred polyimide precursor includes a polyamic acid having a repeating unit represented, for example, by the following general formula,

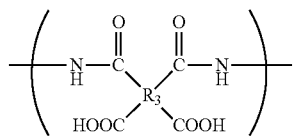

wherein the polyamic acid can be either a homopolymer or copolymer of two or more of the repeating units, wherein $R_3$ is a tetravalent aromatic radical having 1 to 5 benzenoid-unsaturated rings of 6 carbon atoms, the four carbonyl groups being directly bonded to different carbon atoms in a benzene ring of the $R_3$ radical and each pair of carbonyl groups being bonded to adjacent carbon atoms in the benzene ring of the $R_3$ radical; and $R_4$ is a divalent aromatic radical having 1 to 5 benzenoid-unsaturated rings of carbon atoms, the two amino groups being directly bonded to different carbon atoms in the benzene ring of the $R_4$ radical.

Typical examples of a polyamic acid having a repeating unit represented by the general formula above are those obtained from pyromellitic dianhydride ("PMDA") and diaminodiphenyl ether ("ODA") and 3,3',4,4'-biphenyltetracarboxylic dianhydride ("BPDA") and ODA. When subjected to ring closure, the former becomes poly(4,4'-oxydiphenylenepyromellitimide) and the latter becomes poly(4,4'-oxydiphenylene-3,3',4,4'-biphenyltetracarboxy diimide).

A typical example of a polyimide prepared by a solution imidization process is a rigid, aromatic polyimide composition having the recurring unit:

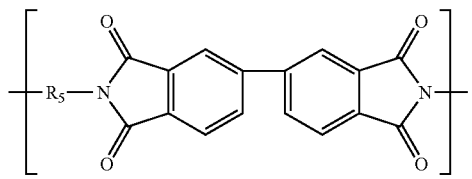

wherein $R_5$ is greater than 60 to about 85 mole percent paraphenylene diamine ("PPD") units and about 15 to less than 40 mole percent metaphenylene diamine ("MPD") units.

The tetracarboxylic acids preferably employed in the practice of the invention, or those from which derivatives useful in the practice of this invention can be prepared, are those having the general formula:

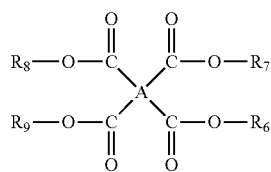

wherein A is a tetravalent organic group and $R_6$ to $R_9$, inclusive, comprise hydrogen or a lower alkyl, and preferably methyl, ethyl, or propyl. The tetravalent organic group A preferably has one of the following structures:

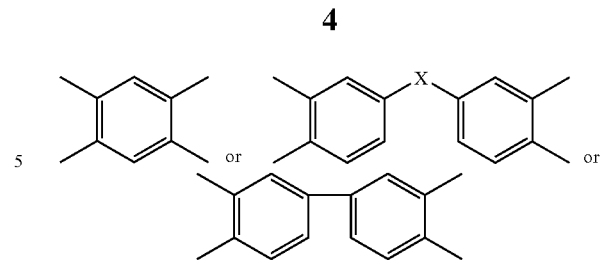

wherein X comprises at least one of

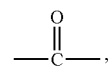

—O—, —S—, —SO$_2$—, —CH$_2$—, —CH$_2$CH$_2$—, and

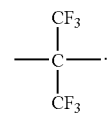

As the aromatic tetracarboxylic acid component, there can be mentioned aromatic tetracarboxylic acids, acid anhydrides thereof, salts thereof and esters thereof. Examples of the aromatic tetracarboxylic acids include 3,3',4,4'-biphenyltetracarboxylic acid, 2,3,3',4'-biphenyltetracarboxylic acid, pyromellitic acid, 3,3',4,4'-benzophenonetetracarboxylic acid, 2,2-bis(3,4-dicarboxyphenyl)propane, bis(3,4-dicarboxyphenyl)methane, bis(3,4-dicarboxyphenyl)ether, bis(3,4-dicarboxyphenyl)thioether, bis(3,4-dicarboxyphenyl) phosphine, 2,2-bis(3',4'-dicarboxyphenyl) hexafluoropropane, 2,2-bis[4-(3,4-dicarboxyphenoxy) phenyl]propane dianhydride and bis(3,4-dicarboxyphenyl) sulfone.

As an organic aromatic diamine, use is preferably made of one or more aromatic and/or heterocyclic diamines, which are themselves known to the art. Such aromatic diamines can be represented by the structure: H$_2$N—R$_{10}$—NH$_2$, wherein R$_{10}$ is an aromatic group containing up to 16 carbon atoms and, optionally, containing up to one hetero atom in the ring, the hetero atom comprising —N—, —O—, or —S—. Also included herein are those R$_{10}$ groups wherein R$_{10}$ is a diphenylene group or a diphenylmethane group. Representative of such diamines are 2,6-diaminopyridine, 3,5-diaminopyridine, meta-phenylene diamine, para-phenylene diamine, p,p'-methylene dianiline, 2,6-diamino toluene, and 2,4-diamino toluene.

Other examples of the aromatic diamine components, which are merely illustrative, include benzene diamines such as 1,4-diaminobenzene, 1,3-diaminobenzene, and 1,2-diaminobenzene; diphenyl(thio)ether diamines such as 4,4'-diaminodiphenylether, 3,4'-diaminodiphenylether, 3,3'-diaminodiphenylether, and 4,4'-diaminodiphenylthioether; benzophenone diamines such as 3,3'-diaminobenzophenone and 4,4'-diaminobenzophenone; diphenylphosphine diamines such as 3,3'-diaminodiphenylphosphine and 4,4'-diaminodiphenylphosphine; diphenylalkylene diamines such as 3,3'-diaminodiphenylmethane, 4,4'-diaminodiphenylmethane, 3,3'-diaminodiphenylpropane, and 4,4'-diaminodiphenylpropane; diphenylsulfide diamines such as 3,3'-diaminodiphenylsulfide and 4,4'-diaminodiphenylsulfide; diphenylsulfone diamines such as 3,3'-diaminodiphenylsulfone and 4,4'-diaminodiphenylsulfone; and benzidines such as benzidine and 3,3'-dimethylbenzidine.

Other useful diamines have at least one non-heteroatom containing aromatic rings or at least two aromatic rings bridged by a functional group.

These aromatic diamines can be employed singly or in combination. Preferably employed as the aromatic diamine component are 1,4-diaminobenzene, 1,3-diaminobenzene, 4,4'-diaminodiphenylether, and mixtures thereof.

A polyamic acid can be obtained by polymerizing an aromatic diamine component and an aromatic tetracarboxylic acid component preferably in substantially equimolar amounts in an organic polar solvent. The amount of all monomers in the solvent can be in the range of about 5 to about 40 weight percent, more preferably in the range of about 6 to about 35 weight percent, and most preferably in the range of about 8 to about 30 weight percent. The temperature for the reaction generally is not higher than about 100° C., preferably in the range of about 10° C. to 80° C. The time for the polymerization reaction generally is in the range of about 0.2 to 60 hours.

Preferably, the polyimide used in the composite is derived from 2,3,3',4'-biphenyltetracarboxylic acid, 3,3',4,4'-biphenyltetracarboxylic acid, 3,3',4,4'-benzophenone tetracarboxylic acid, 2,2'-bis(3,4-dicarboxyphenol)-hexafluoropropane tetracarboxylic acid, or pyromellitic acid, the anhydrides or esters of the acids or mixtures of the acids, the anhydrides or the esters and one or more aromatic diamines.

The carbonaceous filler is mixed with the polymer during the polymer formation process or during the processing of the polymer to form the composite ring or ring segment. That is, carbonaceous filler can be added during the making or formation of the polymer, or during the molding process when the composite part is being formed. The process can be, e.g., compression molding, powder compression, resin transfer molding or any other conventional process for making such articles.

In all embodiments of the present invention the carbonaceous filler is at least about 9 weight percent of graphite powder (or graphite flake), and the total of all components of the composite is 100 weight percent. In a non-limiting example, in one embodiment of the present invention the carbonaceous filler is present at 9 weight percent; the polymer component is present at about 90 weight percent, and particulate is present about 1 weight percent. More specifically, graphite flake carbonaceous filler is present at 9 weight percent; and mineral particulate, preferably kaolinite, is present at about 1 weight percent; and polymer component, preferably polyimide, is present at 90 weight percent.

In yet another embodiment of the present invention, when the carbonaceous filler is present at about 50 weight percent, the polymer component is present at about 50 weight percent and no particulate is present. More specifically, graphite powder is present at 50 weight percent and a polymer component, preferably polyimide, is present at 50 weight percent.

The graphite powder (or flake) has particles of average particle size less than about 50 µm, preferably less than about 10 µm. The graphite powder that can be used in the present invention is substantially free from reactive impurities, particularly metallic impurities. The total metallic impurities should total less that than about 1500 ppm, preferably less than about 10 ppm, of metal sulfides and metal oxides, especially ferric sulfide, barium sulfide, calcium sulfide, copper sulfide, barium oxide, calcium oxide, and copper oxide. The graphite powder can be naturally occurring graphite that has been purified by chemical treatment or commercially available synthetic graphite that is produced with low levels of reactive impurities.

In addition to the graphite powder (or flake), the carbonaceous filler can also contain carbon fibers, woven carbon fabrics or nonwoven carbon mats.

The composite part may also contain up to 51 weight percent of particulate. The particulate can be of various types, including poly(tetrafluoroethylene) (PTFE) homopolymer and copolymer, or mineral fillers, as long as the thermal oxidative weight loss of less than 5% of the present invention is met. Preferred mineral fillers are talc, mica, wollastonite, kaolinite and sepiolite.

The composite of the invention has high thermal oxidative stability. A measure of this is its thermal oxidative weight loss of less than 5% when determined at 700° F. (371° C.) for 100 hours at 70 psi (0.48 MPa) in air, the air being exchanged at a rate of 5 times/hour. The composite was fabricated into tensile bars by direct forming according to ASTM-E8 at room temperature and 100,000 psi (690 MPa) forming pressure. The bars were sintered at 405° C. for 3 hours with a nitrogen purge. Oxidative stability was measured by first weighing the tensile bars. The bars were then exposed to a temperature of 700° F. (371° C.) for 100 hours at a pressure of 70 psi (0.48 MPa) in air. The air was exchanged at a rate of 5 times/hour. A final weight measurement was then taken and the weight loss was calculated in weight percent, i.e. the initial weight minus the final weight divided by the initial weight times 100. The thermal oxidative weight loss was determined for various composites. For example, the thermal oxidative weight loss for a composite comprised of 50 weight percent of a polymeric component wherein the aromatic tetracarboxylic acid component is 3,3'4,4' biphenyltetracarboxylic acid and the diamine component is a mixture of 70 mole % p-phenylene diamine and 30 mole % m-phenylene diamine) and 50 weight percent graphite powder is less than about 2%.

The composites of this invention have low dynamic coefficients of friction. The dynamic coefficient of friction is less 0.5, preferably less than 0.4 and most preferably less than 0.3. As a result, in the case of a composite shroud and a vane making direct contact, less force is needed to move the vane.

The composite airplane engine parts of the present invention are useful as rings or segments of rings, shrouds or segments of shrouds. These composite parts provide wear-resistance, and thermal stability and are lighter in weight than traditional parts made of metal. The composite ring or segment of a ring results in a weight savings of 40-75% compared to a similar metal ring or segment of a ring, i.e., the weight of the composite part is 25-60% of the weight of a similar metal part. When the composite ring or segment of a ring is a shroud, or an inner shroud, or a segment of a shroud, or an inner shroud, used with metal variable vanes, the composite parts reduce or eliminates wear on the vane stems. Further, the composite parts may be direct contact with variable vanes, and have advantages over similar metal parts. The composite parts enable the elimination of bushings between the composite part as well as between a composite part and a metal part, e.g., between a composite inner shroud and a metal vane so that there is direct contact between the composite inner shroud and the metal vane. This simplifies assembly by having fewer parts. These composite parts provide longer life due to the elimination of metal on metal wear and the elimination of bushing wear. The composite parts allow tighter component fits which reduces air leakage around vane stems.

FIG. 1 shows a representation of a typical segment of an inner shroud 10. The segment is in the form of an arc subtending an angle 11. A complete shroud subtends an angle of 360°. A segment of a shroud subtends an angle of a fraction of 360°. The segment of the shroud has an inner radius 12 and an outer radius 13. The segment has a width 14 and contains holes 15 for holding vanes.

EXAMPLES

Example 1

A composite comprised of 50 weight percent of a polymeric component wherein the aromatic tetracarboxylic acid component is 3,3'4,4' biphenyltetracarboxylic acid and the diamine component is a mixture of 70 mole % p-phenylene diamine and 30 mole % m-phenylene diamine and 50 weight percent graphite powder was fabricated into a tensile bar by direct forming according to ASTM E8. The tensile bar was sintered to produce a test bar having a specific gravity of 1.730 g/cm$^3$. Tensile strength and elongation were measured according to ASTM D638. The tensile strength was found to be 12.66 Kpsi (86.9 MPa) and the elongation was 1.6%.

Oxidative stability was measured by first weighing the tensile bar. The bar was then exposed to a temperature of 700° F. (371° C.) for 100 hours at a pressure of 70 psi (0.48 MPa) in air. The air was exchanged at a rate of 5 times/hour. At the end of the hour the bar was weighed again and the (thermal oxidative weight loss) TOWL was 0.67%.

Example 2

A segment of a shroud similar to that shown in FIG. 1 was prepared to directly measure TOWL of a segment of a shroud. The segment of the shroud subtended an angle 11 of 30°. The outer radius 13 was 8.64 inches (21.9 cm), the inner radius 12 was 8.18 inches (20.8) and the width 14 was 1.0 inch (2.5 cm). The segment contained 8 vane holes 15 as shown in FIG. 1. The segment was prepared using a composite comprised of 50 weight percent of a polymeric component wherein the aromatic tetracarboxylic acid component is 3,3'4,4' biphenyltetracarboxylic acid and the diamine component is a mixture of 70 mole % p-phenylene diamine and 30 mole % m-phenylene diamine and 50 weight percent graphite powder. The composite was sintered in a mold to produce the segment with a specific gravity of 1.746 g/cm$^3$. The segment was weighed and then placed in a metal mesh basket. The basket was placed in an oven and the segment was heated to 700° F. (371° C.) at 70 psi in air and maintained under those conditions for an hour. The air flow was such that the air was exchanged 5 times during the hour. At the end of the hour the segment was weighed again to determine how much weight loss occurred as a result of oxidation, i.e., to determine the TOWL. The TOWL was 0.58%.

Example 3

A composite comprised of 90 weight percent of a polymeric component wherein the aromatic tetracarboxylic acid component is 3,3'4,4' biphenyltetracarboxylic acid and the diamine component is a mixture of 70 mole % p-phenylene diamine and 30 mole % m-phenylene diamine and 9 weight percent graphite powder and 1 weight percent kaolinite particulate was fabricated into a tensile bar by direct forming according to ASTM E8. The tensile bar was sintered to produce a test bar having a specific gravity of 1.439 g/cm$^3$. Tensile strength and elongation were measured according to ASTM D638. The tensile strength was found to be 11.53 Kpsi (79.5 MPa) and the elongation was 2.6%

Oxidative stability was measured by first weighing the tensile bar. The bar was then exposed to a temperature of 700° F. (371° C.) for 100 hours at a pressure of 70 psi (0.48 MPa) in air. The air was exchanged at a rate of 5 times/hour. At the end of the hour the bar was weighed again and the TOWL was 2.9%.

What is claimed is:

1. An aircraft engine composite part comprising:
   from about 40 to about 90 weight percent of a polymer component selected from the group consisting of polyimide, polyamide-imide, polyether imide, polybenzimidazole, and blends thereof;
   at least about 9 weight percent of a carbonaceous filler component, where said carbonaceous filler consists of powdered graphite or flake graphite
   optionally, particulate up to about 51 weight percent, where said particulate is selected from the group consisting of talc, mica, wollastonite, kaolinite, and sepiolite;
   wherein the total of all components of the composite is 100 weight percent; where carbon fibers are excluded from the composite; and
   wherein the composite has a thermal oxidative weight loss of less than 5% when determined after heating at 700° F. (371° C.) for 100 hours at 70 psi (0.48 MPa) in air, the air being exchanged at a rate of 5 times/hour, and has a dynamic coefficient of friction of less than 0.5 and wherein said composite part is an inner shroud or a segment of an inner shroud.

2. The composite part of claim 1 wherein said polymer is polyimide and carbonaceous filler is graphite powder.

3. The composite part of claim 1, comprising about 50 weight percent polymer and about 50 weight percent carbonaceous filler.

4. The composite part of claim 1, comprising about 90 weight percent polymer; about 9 weight percent carbonaceous filler and about 1 weight percent particulate.

5. The composite part of claim 3, wherein said carbonaceous filler is graphite powder having particles with an average size of less than about 50 μm.

6. The composite part of claim 3, wherein said carbonaceous filler is graphite powder having particles with an average size of less than about 10 μm or less.

7. The composite part of claim 1, wherein said polyimide is derived from 2,3,3',4'-biphenyltetracarboxylic acid, 3,3',4,4'-biphenyltetracarboxylic acid, 3,3',4,4'-benzophenone tetracarboxylic acid, 2,2'-bis(3,4-dicarboxyphenol)-hexafluoropropane tetracarboxylic acid, or pyromellitic acid, the anhydride or esters of said acid or mixtures of said acids, said anhydrides or said esters and one or more aromatic diamines.

8. The composite part of claim 2 or 3, wherein said inner shroud or said segment of said inner shroud is used with variable vanes.

9. The composite part of claim 6, wherein said inner shroud or said segment of said inner shroud is in direct contact with variable vanes.

* * * * *